US005603008A

United States Patent [19]
Hilton et al.

[11] Patent Number: 5,603,008
[45] Date of Patent: Feb. 11, 1997

[54] COMPUTER SYSTEM HAVING CACHE MEMORIES WITH INDEPENDENTLY VALIDATED KEYS IN THE TLB

[75] Inventors: Ronald N. Hilton, Cupertino; Stephen C. Magee, San Jose; Jeffrey L. Baker, Milpitas, all of Calif.

[73] Assignee: Amdahl Corporation, Sunnyvale, Calif.

[21] Appl. No.: 337,133

[22] Filed: Nov. 10, 1994

Related U.S. Application Data

[63] Continuation of Ser. No. 954,297, Sep. 30, 1992, abandoned.

[51] Int. Cl.$^6$ ............................. G06F 12/10; G06F 12/14
[52] U.S. Cl. .......................................... 395/491; 395/417
[58] Field of Search ....................... 395/417, 491, 395/483

[56] References Cited

U.S. PATENT DOCUMENTS

| | | | |
|---|---|---|---|
| 3,761,883 | 9/1973 | Alvarez et al. | 395/491 |
| 4,481,573 | 11/1984 | Fukunaga et al. | 395/417 |
| 4,775,955 | 10/1988 | Liu | 395/472 |
| 4,899,275 | 2/1990 | Sachs et al. | 395/403 |
| 5,197,139 | 3/1993 | Emma et al. | 395/417 |
| 5,226,133 | 7/1993 | Taylor et al. | 395/417 |
| 5,233,702 | 8/1993 | Emma et al. | 395/445 |
| 5,265,227 | 11/1993 | Kohn et al. | 395/417 |
| 5,276,848 | 1/1994 | Gallagher et al. | 395/448 |
| 5,280,592 | 1/1994 | Ryba et al. | 395/375 |

OTHER PUBLICATIONS

ESA/370 Principles of Operation, Chapter 3. Storage, pp. 3–7 to 3–11.

*Primary Examiner*—Eddie P. Chan
*Assistant Examiner*—Reginald G. Bragdon
*Attorney, Agent, or Firm*—Fliesler, Dubb, Meyer & Lovejoy

[57] ABSTRACT

A storage unit for a data processing system includes a cache data buffer, a cache tag, and a translation lookaside buffer (TLB). Storage keys are maintained in the TLB with a separate valid bit, which allows a valid translation to be stored upon completion of a translation, even though the key is not yet available. With a valid translation in the TLB entry available, the requesting port is then able to send off a move in request to mainstore right away in parallel with a key request from the translator to the mainstore key array. In the typical case, the key will be returned several cycles ahead of the data, allowing it to be written into the TLB entry and validated in time for the move in data to be successfully bypassed to the requestor as soon as it arrives.

2 Claims, 6 Drawing Sheets

| | |
|---|---|
| 500 | REQUEST |
| 501 | TLB MISS |
| 502 | TR WAIT |
| 503 | TAG MISS |
| 504 | SEND MI REQUEST |
| 505 | MS WAIT |
| 506 | STATUS VALID |
| 507 | TR BUSY |
| 508 | SEG FLOW |
| 509 | PAGE FLOW |
| 510 | MRU TABLE LOOKUP |
| 511 | TLB WRITE FLOW |
| 512 | SEND KEY REQUEST |
| 513 | KEY WAIT |
| 514 | TLB KEY WRITE FLOW |

FIG. 5

| | |
|---|---|
| 600 | REQUEST |
| 601 | TKV MISS |
| 602 | TR WAIT |
| 603 | STATUS VALID |
| 604 | TR BUSY |
| 605 | SEND KEY REQUEST |
| 606 | KEY WAIT |
| 607 | TLB KEY WRITE FLOW |

COMPUTER SYSTEM HAVING CACHE MEMORIES WITH INDEPENDENTLY VALIDATED KEYS IN THE TLB

This application is a continuation of Ser. No. 07/954,297, filed Sep. 30, 1992, now abandoned.

BACKGROUND OF THE INVENTION

1. Field of the Invention

The present invention relates to computer systems having cache memories in which access to data is controlled with storage keys.

2. Description of Related Art

Large scale computer systems, such as systems based on the IBM ESA/370 or ESA/390 architectures, associate storage keys with partitions of mainstore to control access. In order to access data from a given partition of the mainstore, the requestor must use the appropriate storage key. These systems also include cache memories which store lines of data. The cache memories must maintain the storage key protection. Thus, storage keys for the lines of data held in the cache must be available in the cache memory system. See, IBM ESA/370 Principles of Operation, particular pages 3–7 through 3–11 concerning storage keys.

A question which always arises early in the design of such cache memory systems is whether the storage keys should be kept in the tags, which associate a physical address with a line of data in the cache, or in the translation lookaside buffer, which maintains translations from logical addresses used to access the cache, to physical addresses kept in the tag. Prior art systems have kept the storage keys in both places.

If the storage key is kept in the tag, the key and data can be moved in with a single operation, since the cache tags are logically associated with cache data. However, protection exceptions, which are based on the keys that apply to entire partitions of mainstore rather than single lines, cannot be determined unless the data subject of the request is cache resident. Thus, store ahead may only be done on cache accesses which are not key protected, that is, having a key of zero in the IBM ESA/370 architecture.

Also, with keys stored in the tag on line boundaries, move in performance of cache data may be affected by the mainstore key array bandwidth, since the keys must be supplied with each move in.

Because TLB entries are maintained on page boundaries, a given storage key need only be accessed once per page if the key is maintained in the TLB. This reduces traffic to mainstore for key related requests, such as set change bit and the like. Also, the Set-Storage-Key instruction (SSK) can be implemented using a TLB based search similar to that of the Invalidate-Page-Table-Entry instruction (IPTE).

However, in a system which maintains keys in the TLB, entries in the TLB for real pages must be kept in the TLB, which dilutes the TLB somewhat and adds some complexity due to the possibility that virtual-equal-real pages and high usage real pages, such as page zero, will be cache resident. However, there has been a growing need to keep real entries in the TLB anyway as the mapping from real to physical addresses or their equivalent, and associated addressing exception analysis, have become increasingly complex.

Thus, it would be desirable to provide for maintaining the storage keys in cache memory systems, which takes advantage of the performance advantage of tag based approaches in which the mainstore key and data can be moved in with a single operation, while also taking advantage of maintaining keys on page boundaries in the TLB.

SUMMARY OF THE INVENTION

The present invention provides a TLB based key approach, which overcomes the performance disadvantages of prior art systems. According to the present invention, the storage key is maintained in the TLB with a separate valid bit, which allows a valid translation to be written to a TLB entry upon completion of a translation, even though the key is not yet available. With a valid translation in the TLB entry available, the requesting port is then able to send off a move in request to mainstore right away in parallel with a key request from the translator to the mainstore key array. In the typical case, the key will be returned several cycles ahead of the data, allowing it to be written into the TLB entry and validated in time for the move in data to be successfully bypassed to the requestor as soon as it arrives.

Accordingly, the present invention can be characterized as a storage unit for a data processing system. The storage unit includes a translation lookaside buffer (TLB), having TLB entries addressed by first subset of a logical page address. The TLB entries store a translation including a second subset of a logical page address, a physical page address, and a translation valid indicator, and further store the storage key for the physical page address, and a storage key valid indicator. The storage unit also includes a cache tag which is addressed by a subset of the logical line address, and stores a physical page address for the corresponding line in a cache data buffer. The cache data buffer also is addressed by the subset of the logical line address, and stores the actual data lines.

TLB match logic is coupled with the TLB and receives the logical page address from the request, performs translation match with at least the second subset of logical page address in TLB entries, and receives the storage key from the request for key match with the storage key in the TLB entries. Upon translation match and key match, access to the cache data buffer is enabled. If the key does not match, then a storage protection exception is signalled. If the key is not valid, then it must be obtained from the mainstore key array.

The storage unit also includes tag match logic, which is coupled to the cache tag and receives at least the subset of the logical line address from the request and a physical address from a TLB entry for tag match with the physical page address in a tag entry. Upon tag match, access to the corresponding data line in the cache data buffer is granted.

By maintaining a separate storage key valid indicator in the TLB, the storage keys may be retrieved and marked valid separately from accesses to lines of data in the mainstore. In addition, translations for the TLB entries may be retrieved and marked valid separately from the storage keys for a particular TLB entry.

According to another aspect, the present invention can be characterized as a computer system which includes a mainstore addressed by physical addresses, and a plurality of processing units which share the mainstore. The processing units include respective cache memory systems which are responsive to requests including logical addresses and storage keys assigned to the respective processing units. A system controller is coupled to the plurality of processing units and the mainstore, and controls transfer of data among the cache memory systems in the plurality of processing units and the mainstore. The system controller includes means for maintaining an array of storage keys on physical address page boundaries.

The cache memory systems include translation lookaside buffers including entries on physical page boundaries with separately validated storage keys for the physical page of respective entries in the TLB. The cache memory system includes a translation lookaside buffer, cache tag, cache data buffer, TLB entry match logic, and tag match logic, as described above. Also, the cache memory system includes control for retrieving storage keys for TLB entries from the array maintained by the system controller, and for marking retrieved storage keys valid. Also, the cache memory systems include control for retrieving lines of data from the mainstore through the system controller. This control for retrieving lines of data is separate from and may function concurrently with the means for retrieving storage keys. Finally, the cache memory system includes control for generating translations for TLB entries separately from the control for retrieving storage keys.

According to yet another aspect of the invention, the cache data buffer and cache tag include associative sets of tag entries, and the TLB includes associative sets of TLB entries. The tag match and TLB match logic are operative to select appropriate entries from the associative sets.

Thus, a system for keeping storage keys on page boundaries in a translation lookaside buffer is provided. The invention provides a net performance improvement over prior art systems because the performance gained from the ability to do store ahead on accesses which are subject to protection is at least an order of magnitude greater than the performance lost due to key misses under this scheme.

Other aspects and advantages of the present invention can be seen upon review of the figures, the detailed description, and the claims which follow.

DESCRIPTION OF THE PREFERRED EMBODIMENTS

Figure 1:
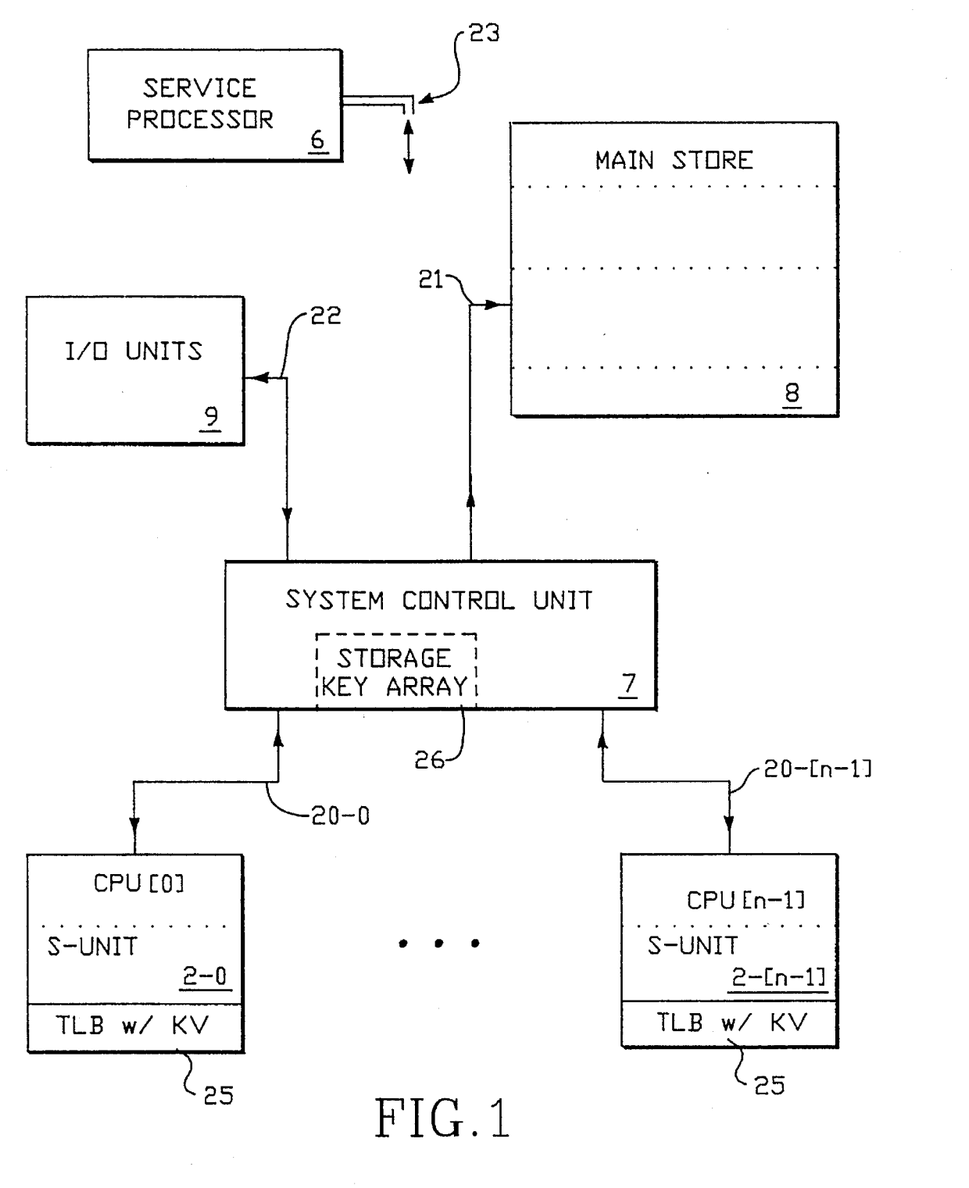
FIG. 1 depicts a block diagram of a multiple CPU system incorporating the present invention.
Figure 2:
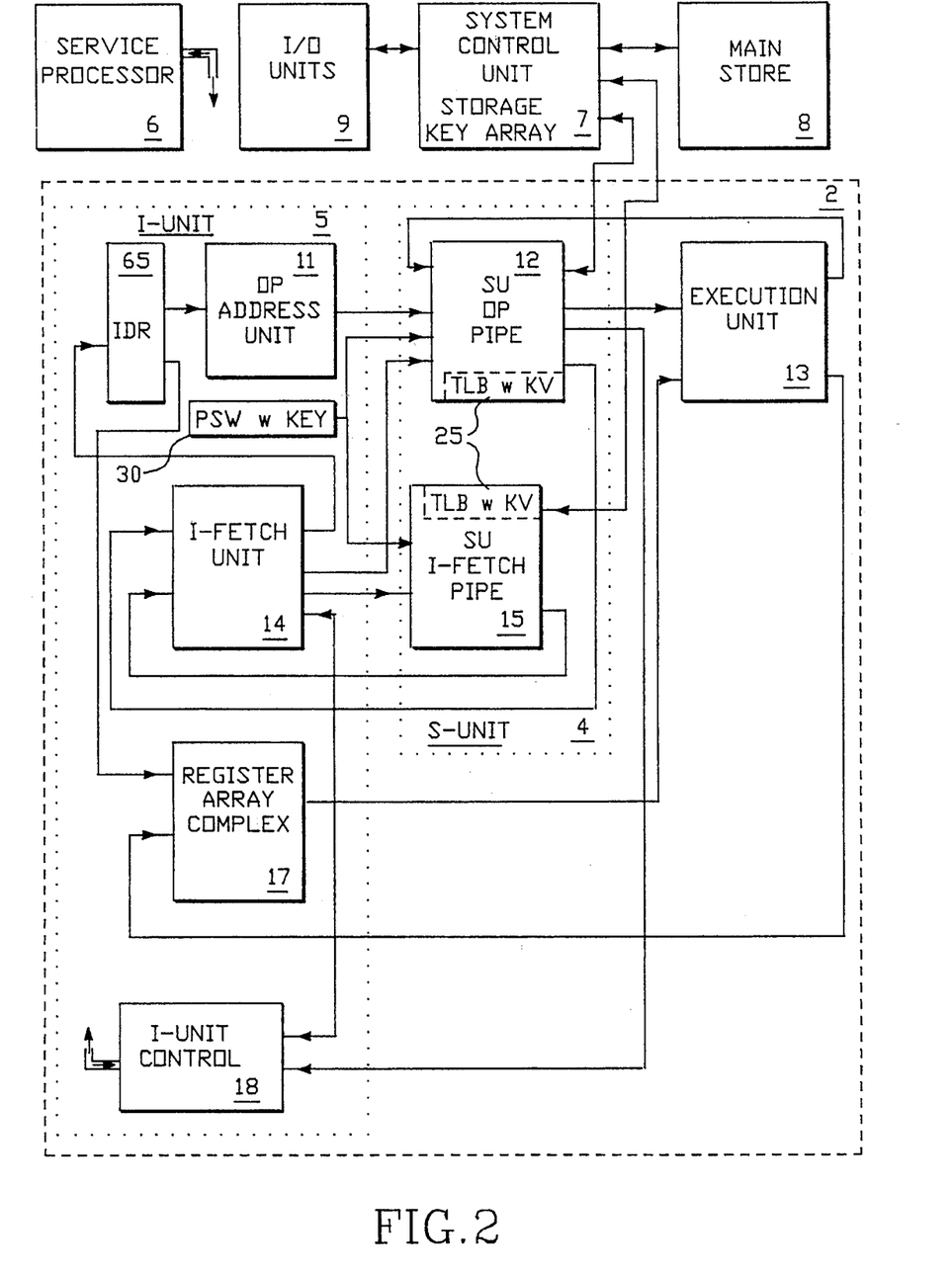
FIG. 2 depicts a block diagram of a CPU incorporating the present invention.

A detailed description of the preferred embodiments is presented with respect to the figures. FIGS. 1 and 2 provide a system overview of a computer system implementing the present invention. FIGS. 3–7 provide a detailed functional description of the computer system having independently validated storage keys in the TLB according to the present invention.

Computer System Overview—FIGS. 1 and 2

FIG. 1 illustrates a multi-CPU computer system according to the present invention. The computer system includes a plurality of central processing units, each having a storage unit with a cache according to the present invention. Thus, CPUs (0) through CPU (n−1) are given reference numbers 2-0 through 2-(n−1). Each of the CPUs is coupled to system control unit 7 across interfaces 20-0 through 20-(n−1). The system control unit also includes a mainstore interface 21. The system control unit 7 controls access to data among the CPUs and mainstore 8 and maintains storage key array 26. Also coupled to the system control unit 7 through interface 22 are the input/output units 9. A service processor 6 is coupled to all of the functional units of the computer system, as indicated by arrows 23 through a scan interface or otherwise known in the art.

As indicated in the figure, each of the CPUs, CPU-0 through CPU-n−1 includes an individual storage unit. Each storage unit includes an operand cache and an instruction cache. The operand cache and instruction cache include a TLB 25 with independently validated storage keys having key valid indicators (KV) according to the present invention as described in more detail below.

FIG. 2 provides a more detailed diagram of a CPU 2 according to the present invention. The CPU 2, as illustrated in FIG. 1, is coupled to the system control unit 7 (which includes a storage key array maintenance server), which is in turn coupled to the mainstore 8 and the I/O units 9. Service processor 6 is coupled to the CPU 2 with scan-in and scan-out facilities.

The CPU 2 includes an instruction unit 5 (I UNIT), a storage unit 4 (S UNIT), and an execution unit 13 (E UNIT). The I UNIT 5 includes an instruction decode register 65 (IDR) which supplies input to an operand address unit 11. Also, the IDR 65 supplies input to register array complex 17. The input to the IDR 65 is provided by an instruction fetch unit 14 (I FETCH UNIT). I UNIT control 18 controls the operation of the functional blocks of the I UNIT 5 and includes explicit connections to the I FETCH UNIT 14 and the S UNIT operand pipe 12.

The S UNIT 4 includes a storage unit operand pipe 12 and a storage unit I FETCH pipe 15. Coupled to the operand pipe 12 is an associatively addressed operand cache. Similarly, coupled to the I FETCH pipe 15 is an associatively addressed instruction cache. The S UNIT operand pipe 12 is addressed from the output of the operand address unit 11 and the I FETCH UNIT 14. The S UNIT I FETCH pipe 15 receives its addresses from the I FETCH UNIT 14.

The S UNIT operand pipe 12 supplies data to the E UNIT 13, the I UNIT control 18, and the I FETCH UNIT 14. The S UNIT I FETCH pipe 15 provides data to the I FETCH UNIT 14. Both the S UNIT I FETCH pipe 15 and the S UNIT operand pipe 12 are coupled to the system control units 7, through which access to the main store 8 is provided and data integrity operations are accomplished to insure cache consistency with other CPUs in the system.

The E UNIT 13 provides resulting data to the S UNIT operand pipe 12 and to the register array complex 17.

A program status word (PSW) register 30 is maintained by each logical or physical processing unit which requests access to the storage unit instruction or data caches. Thus, the PSW register 30 is coupled to both the S UNIT operand pipe 12 and the S UNIT I FETCH pipe 15. The PSW includes the storage key assigned to accesses by respective processing units. The operand cache and instruction cache include a TLB 25, as noted above with respect to FIG. 1.

The overall computer system as described in FIGS. 1 and 2 operates in accordance with the IBM ESA/390 or ESA/370 architecture and is further compatible with the Amdahl 5995-M computer.

Figure 3:
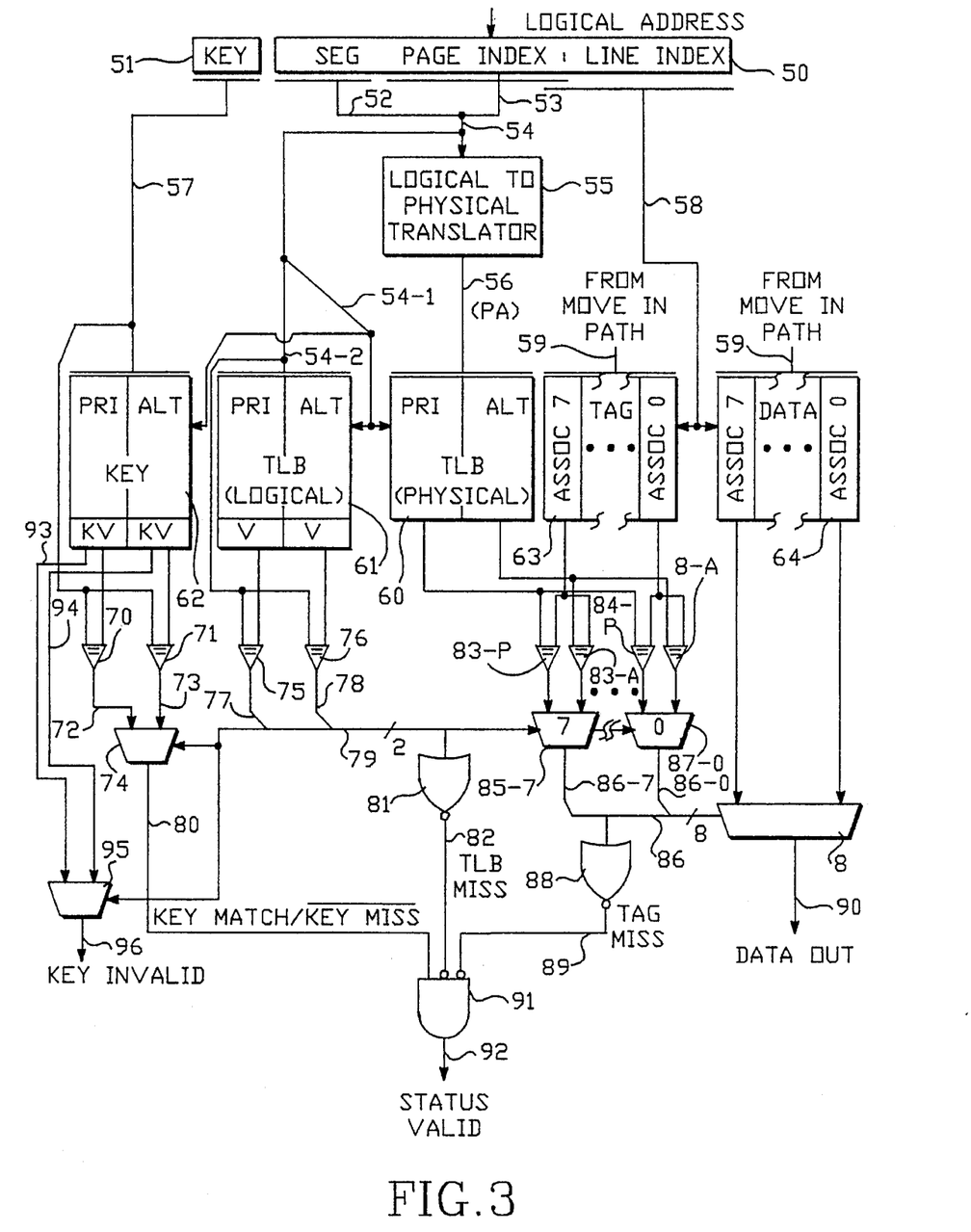
FIG. 3 is a logical diagram of a cache memory system according to the present invention.

Logical Depiction of Cache Memory System with Independently Validated Keys in the TLB (FIG. 3)

FIG. 3 illustrates the logic of an operand cache memory system using independently validated keys in the TLB. The cache memory system is accessed with a logical address 50 and a storage key 51. The logical address is generated in the operand address unit 11. Key 51 is provided from the program status word assigned to the requesting processing unit. The logical address includes a line index in the low order bits, a page index in higher order bits, and a segment index in the highest order bits. The segment and page indexes combine on lines 52 and 53 to make a logical page address on line 54. A translator 55 is associated with the cache for translating the logical addresses from line 54 into physical addresses for supply on line 56.

The cache memory system includes a translation lookaside buffer (TLB), a tag, and a data buffer. The TLB logically includes the physical TLB 60, the logical TLB 61, and the storage key buffer 62. The physical TLB 60, logical TLB 61, and key buffer 62 are all addressed by a subset of the logical address 54-1 from line 54. The logical TLB 61 stores a second subset of the logical address in each TLB entry. The second subset of the logical address is supplied as input to the logical TLB 61 across line 54-2. Also, a translation valid indicator V is stored with each TLB entry. Also, the logical TLB 61 includes primary and alternate associativities, such that each address selects a set of 2 TLB entries.

The physical TLB 60 stores a physical page address for each TLB entry. Likewise, the physical TLB includes primary and alternate associativities. Data is supplied to the physical TLB 60 from line 56 out of the translator 55.

The TLB key buffer 62 includes a storage key and a key valid indicator KV for each TLB entry. Also, the key buffer 62 includes primary and alternate associativities. The keys stored in the key buffer 62 are supplied from the key register 51 across line 57.

The cache memory system includes an associatively addressed tag 63, and an associatively addressed data buffer 64 (associativities 0–7 in this example). The tag 63 and data buffer 64 are addressed with a subset of the page index and the full line index across line 58. Data is supplied to the cache tag and the cache data buffer across move in path 59. Entries in the cache tag 63 include a physical page address for a corresponding data line in the cache data buffer 64.

For a given request, which includes a key, a logical page address on line 54, and a logical line address on line 58, the key buffer 62, logical TLB 61, physical TLB 60, cache tag 63, and cache data buffer 64 are accessed. Key match is executed in match logic 70 for the primary associativity and match logic 71 for the alternate associativity for the key buffer 62. The key match logic 70, 71 matches the key from line 57 with the key from the respective associativities of the key buffer 62 and generates a match signal on outputs 72 and 73, respectively, if an addressed key from the key buffer 62 matches the key on line 57, and if the key valid bit is set for the matching entry. The match signals on lines 72 and 73 are coupled to associativity select logic 74.

TLB match is performed in TLB match logic 75 for the primary associativity and match logic 76 for the alternate associativity. The TLB match logic 75, 76 matches the second subset of the logical address on line 54-2 with the subset of the logical address stored in the TLB entries in the respective associativities. This provides a full match on the logical page address over the first subset which is used to address the TLB, and the second subset which is stored in the TLB. Thus, if a logical address stored in the logical TLB buffer matches the logical address of a request, a TLB match signal is generated on line 77 or line 78 for the respective associativities, and merged on line 79. If neither the signal on line 77 nor the signal on line 78 is true, as indicated by NOR gate 81, then a TLB miss is indicated on line 82. The merged signals on line 79 are used to control the associativity selector 74 for the key match signals on lines 72 and 73. Thus, the output of the associativity selector 74 is the key match/key miss signal on line 80. If the key does not match, then a storage protection exception is signalled. If the key is not valid, then it must be obtained from the storage key array 26. The merged signals on line 79 are used to control the associativity selector 95 for the key validation signals on lines 93 and 94. Thus, the output of the associativity selector 95 is the key invalid signal on line 96.

The physical page address stored in the physical TLB 60 is used for tag match. Thus, tag match logic is provided for determining matches on each associativity in the tag buffer 63 with each associativity in the physical TLB buffer 60. Thus, the tag match logic includes comparators 83-P and 83-A which match on the tag entry in associativity 7 of the tag 63. Also, comparators 84-P for the primary TLB entry and 84-A for the alternate TLB entry are provided for matching on the physical page address stored in associativity 0 of the tag 63. As can be seen, the tag and data buffer 63, 64 are eight way associative in this system. Thus, there is a set of 8 pairs of comparators in the tag match logic in the present system. TLB associativity selectors 85-0 through 85-7 are included, and are responsive to the TLB match signals on line 79 to select either the primary or alternate tag match comparator for supply on lines 86-7 through 86-0. These signals merge in the figure on line 86 and are used to control associativity selector 87 for the cache data buffer 64. If none of the signals on line 86 are true, then a tag miss is indicated, as indicated by NOR gate 88 and tag miss line 89.

The data line addressed by the logical line address on line 58 is supplied to associativity selector 87, and a single cache line is supplied on line 90. The key match/key miss signal on line 80, TLB miss signal on line 82, and tag miss signal are supplied to status valid logic represented by AND gate 91 having active high input on line 80, and active low inputs on lines 82 and 89. A status valid signal is supplied on line 92 indicating whether it is okay to use the data on line 90. Thus, as can be seen, the TLB match logic, tag match logic, and key match logic are used to enable access to lines of data in the cache. A TLB miss as indicated on line 82 results in a request to the logical-to-physical translator 55 to compose a TLB entry for the request. After the translator 55 has completed the translation, a key request is issued independently to retrieve a storage key for the physical address indicated by the translation.

A tag miss as indicated on line 89 results in a request to move in the line of data from mainstore. The move in of the line of data subject of a TLB miss can be made concurrently with the retrieval of a storage key for the TLB entry. This operation can be better understood with reference to the operand pipeline illustrated in FIG. 4 below.

Figure 4:
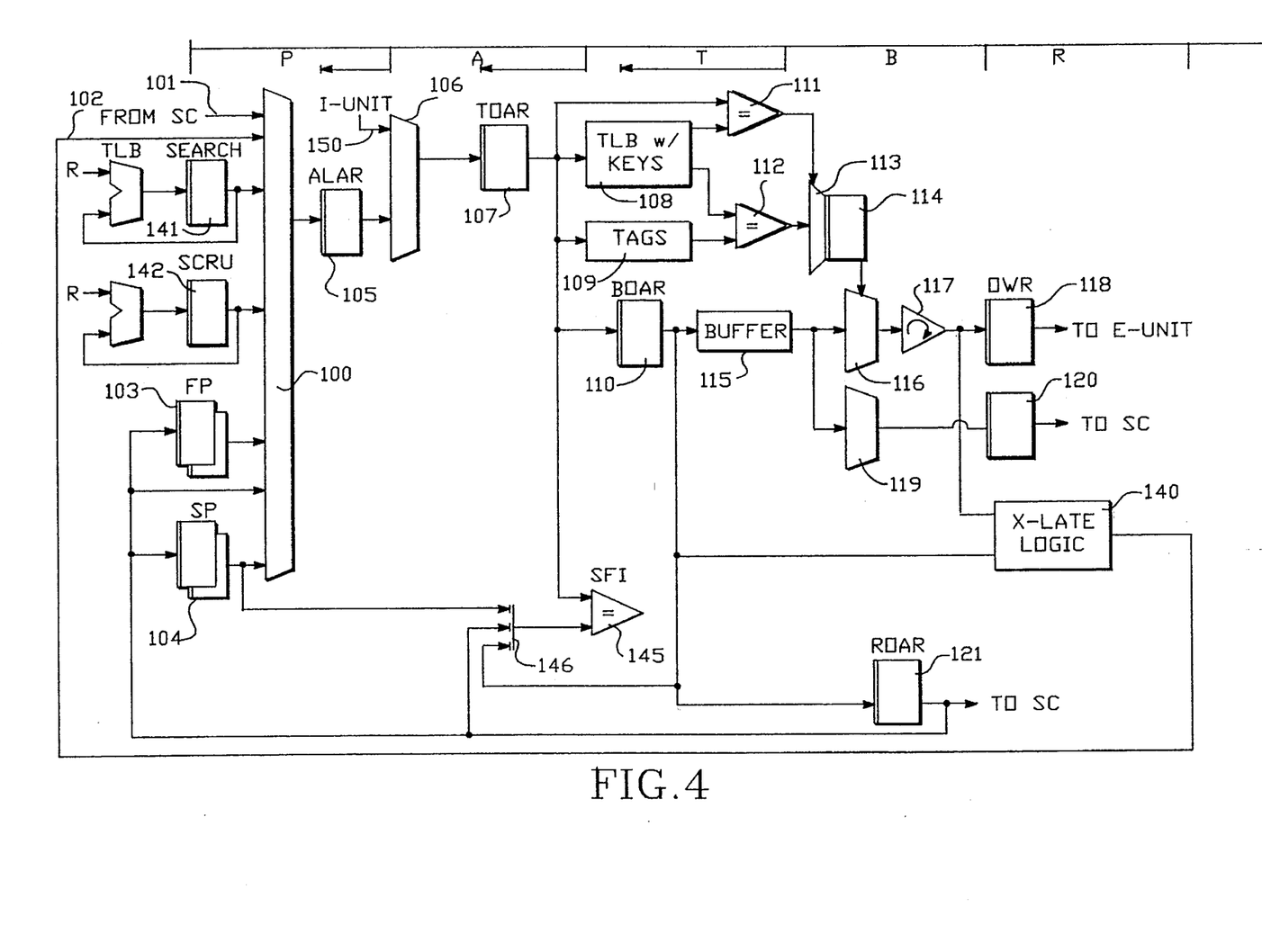
FIG. 4 is a schematic block diagram of a storage unit pipeline according to the present invention.
Figure 5:
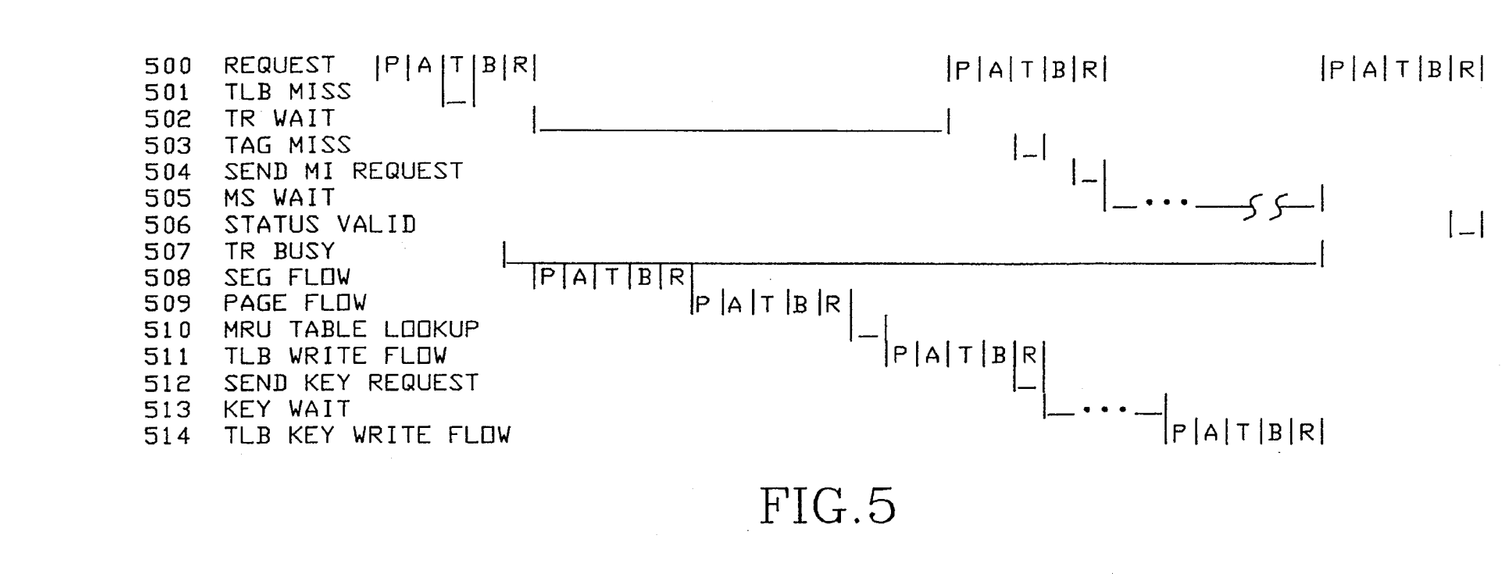
FIG. 5 illustrates control flows in the storage unit pipeline for TLB miss accesses according to the present invention.
Figure 6:
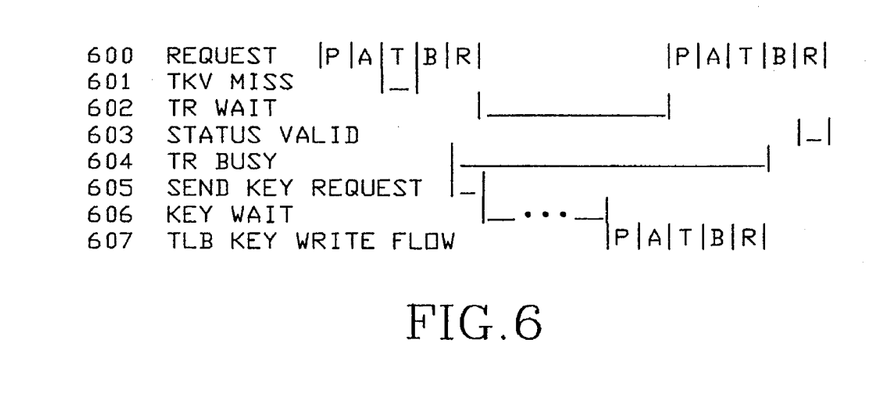
FIG. 6 illustrates control flow in the storage unit pipeline for storage key not valid accesses according to the present invention.

S UNIT Operand Pipe Control (FIGS. 4–6)

FIG. 4 is a simplified functional diagram illustrating control of the S UNIT operand pipe. The system includes priority logic 100 receiving a plurality of requests for access to the cache. The inputs to the priority logic 100 include requests from the system controller (SC) 101, and other requests 102 for processes needing access to data in the cache, such as fetch ports 103, store ports 104, and logical-to-physical translator logic 140. The output of the priority logic 100 is supplied to an address register 105. The address register 105 supplies its output to a second level of priority logic 106. The instruction unit supplies logical address and storage keys from line 150 through priority logic 106 to the storage unit pipe. The output of the priority logic 106 is supplied to the T cycle operand address register 107. The T cycle operand address register 107 is used to access the translation lookaside buffer 108 (TLB) with independently validated storage keys and tag memory 109 which are implemented as described in FIG. 3. Also, the output of the T cycle operand address register 107 is supplied to the B cycle operand address register 110.

The output of the TLB 108 is supplied to TLB match logic 111 in parallel with the output of the T cycle operand address register 107. Similarly, the output of the tag memory 109 is supplied to tag match logic 112 in parallel with a segment of the TLB memory 108. The output of the tag match logic is supplied to TLB associativity selector 113 which is further enabled by the TLB match logic 111. The results of the tag match are stored in register 114.

In parallel, the B cycle operand address register 110 is used to access the buffer memory 115. The outputs of the buffer memory 115 are supplied to associativity selector 116 which is enabled by the results of the tag match from register 114. The output of the selector 116 is supplied through alignment logic 117 to operand word register 118, and then to the execution unit. Also, the output of alignment logic 117 is supplied to the translation logic 140, which supports address translations used for logical and real addressing.

Similarly, the output of the buffer 115 is supplied to associativity select logic 119 and on to a data move out register 120 which is coupled to the system controller.

The output of the B cycle operand address register is also supplied to the translation logic 140, and to an R cycle operand address register 121 which is connected to the system controller, and to the store ports 104, priority logic 100, and fetch ports 103. The outputs of the B cycle operand address register 110, R cycle operand address register 121, and store ports 104 are merged on line 146 to the Store-Fetch-Interlock (SFI) comparator 145.

Shown across the top of the figure are an indication of the pipeline stages: P for priority, A for address, T for TLB and tag access, B for buffer access, and R for results. In the P cycle, a port is selected by logic 100 for loading into register 105. In the A cycle, a request is loaded into the TOAR 107. In the T cycle, the TLB and tags are accessed, as described with reference to FIG. 3. In the B cycle, the cache buffer is accessed. In the R cycle, the results of the cache buffer access are posted to the E UNIT, the system controller and/or the translate logic.

As can be seen, the input data paths to the buffer 115 are not shown in the figure for simplicity.

FIGS. 5 and 6 show the control flows for a TLB miss, and for a TLB key valid miss, respectively, in the pipeline of FIG. 4.

The TLB miss sequence is illustrated in FIG. 5. A request is issued in a first P cycle, as shown in line 500. In the T cycle of the first request, a TLB miss is detected (line 501). At the end of the B cycle of the request, a translator busy state is entered (line 507). At the end of the R cycle of the first request, a translator wait state is entered (line 502).

Also at the end of the R cycle of the request, the translator issues a segment flow as indicated on line 508 to retrieve the segment table for the logical address. At the end of the segment flow, a page flow is issued as indicated on line 509 to retrieve the real page address for the logical address subject of the translation. At the end of the R cycle, a mainstore reconfigurable unit (MRU) table lookup is conducted as indicated at line 510, which maps the real address to the physical mainstore address.

After the MRU table lookup, the translation is completed and a TLB write flow is initiated (line 511). At the end of the write flow, a key request is issued (line 512). In the next cycle, a key wait state is entered (line 513). The key wait state persists for the time in which it takes the system controller to return a key in response to the key request. This can be a variable amount of time ranging in a large scale system such as the Amdahl 5990-M around about 15 cycles. After the key wait state, a TLB key write flow is initiated (line 514). The translator busy state is ended as indicated at line 507 after the key write flow.

Once the translation has been completed and the TLB write flow begins, a second data request can be reasserted with the timing indicated in line 500. As can be seen, the P cycle of the second data request lines up with the T cycle of the TLB write flow in line 511. In this way, the results of the TLB write flow are guaranteed to be present during the T cycle of the request.

Most likely, during the second data request, a tag miss will be detected as indicated at line 503. In response to the tag miss, a move in request is issued in the R cycle (line 504). After the move in request, a mainstore wait state is entered (line 505). The length of the wait state can vary, but for a system such as the Amdahl 5990-M, this state may range around about 25 cycles. After the mainstore wait state, the request is initiated for a third time (line 500). By this time, the key write flow in line 514 will have completed, the move in will have completed, and successful access will be signalled by the status valid indication (line 506).

Thus, FIG. 5 illustrates that the control of the operand pipeline includes logic for executing a translation separately from the key request, and logic for initiating a move in separately from the key request. This allows the key request to go concurrently with the move in.

The overlapped operation of the key flow and the move in flow would be more difficult in the case of a move in requested by the translator, because the translator would be responsible for both the key request and the move in request. However, translator move in requests are not subject to key protection checking anyway, and the translator will not initiate a key request in this case. In the event that a subsequent access which is subject to protection checking is made to the page which did not include a valid key after a translator move in, then a key miss will be incurred as described with reference to FIG. 6.

In all other cases involving accesses that are not subject to key protection, the translator will go ahead and initiate a key request because it will not interfere with the completion of such accesses, and will avoid a key miss on any future accesses to that page which are subject to protection checking.

By keeping a separate valid bit for the key in the TLB, a valid TLB entry can be created upon completion of a translation even though the key is not yet available. With a valid TLB entry available, the requesting port is then able to send off a move in request to mainstore right away, concurrently with the key request from the translator to the mainstore key array. In a typical case, the key will be returned several cycles ahead of the data, allowing it to be written into the TLB entry and validated in time for the move in data to be successfully bypassed to the requestor as soon as it arrives. Because a TLB miss is usually followed by a tag miss, the "key miss" penalty will therefore usually be completely hidden by the move in penalty.

FIG. 6 illustrates the control flows on a TLB key valid miss, such as may occur in the event that the TLB translation is already present and valid, but the key is not valid.

The request is issued in line 600 of FIG. 6. In the T cycle, a TLB key valid miss will be detected (line 601). In response, the translator busy state is entered at the end of the B cycle and a key request is issued in the R cycle as indicated on lines 604 and 605, respectively. Also in the R cycle, a translator wait state is entered (line 602). After the key request in line 605, a key wait state is entered (Line 606). After the key is returned, a TLB key write flow is initiated (line 607).

The translator wait state indicated on line 602 is lifted on the T cycle of the TLB key write flow of line 607. Thus, the results of the key write flow are present in the T cycle of the second request on line 600. The second request will be successful and status valid posted in the R cycle (line 603).

Figure 7:
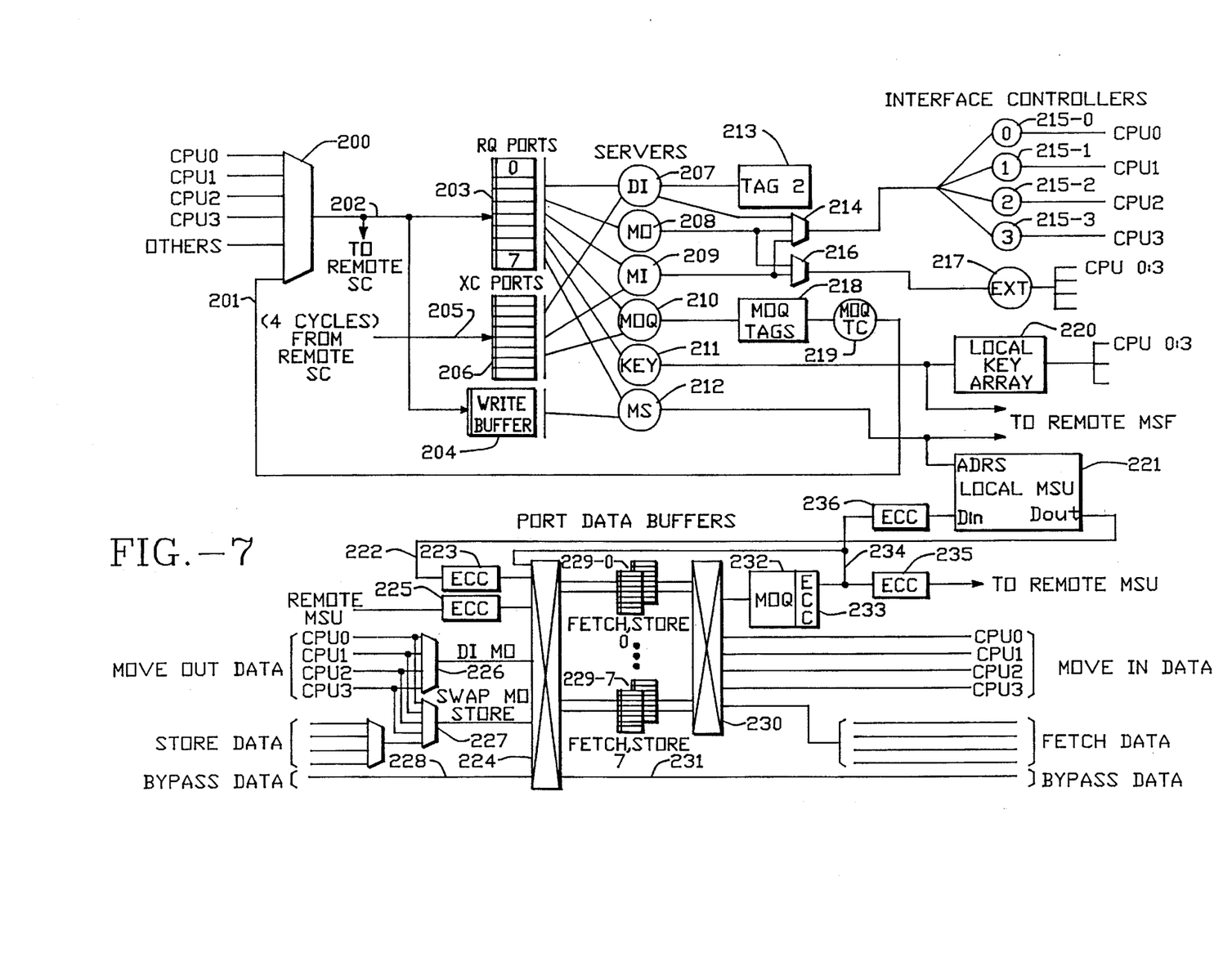
FIG. 7 is a functional block diagram of the system controller for a multi-CPU system according to the present invention.

System Controller with Key Array (FIG. 7)

FIG. 7 illustrates a functional block diagram of the system controller which maintains the mainstore key array according to the present invention. The system controller includes a system for controlling access to data among the CPUs in other portions of the system, such as the service processor, the main storage unit, I/O processors, and the like. Thus, it includes an input priority logic 200 which receives requests from CPU 0 through CPU n (n=3 in the embodiment of FIG. 7). Other requestors to the system controller are also supplied as inputs to the priority logic 200, such as the service processor, I/O processors, and the like. Also, a move out queue bus 201 is supplied as an input to the priority logic 200. The output of the priority logic 200 is supplied on line 202 to the request ports 203 and to a write buffer 204. A remote system controller (in a system including a plurality of system controllers) is also coupled through line 205 to cross coupled request ports 206.

The request ports 203 and 206 are coupled to a plurality of servers, including a data integrity server 207, a move out server 208, a move in server 209, a move out queue server 210, a key server 211, and a mainstore server 212. The remote system controller has access only to the data integrity server 207, move in server 209, and move out queue server 210. The write buffer 204 has access only to the mainstore server 212 and is dedicated for writes to mainstore.

The data integrity server 207 is coupled to the TAG2 logic 213. The TAG2 logic includes copies of the tags from all of the storage units for the CPUs of the system. Thus, data integrity and cache consistency operations are carried out using the data integrity server 207 and the TAG2 logic 213. Requests for data from the data integrity server 207, move out server 208, and move in server 209, are supplied through selector 214 to the interface controllers for each of the CPUs 215-0 through 215-3. Also, requests from move out server 208 and move in server 209 are supplied through selector 216 through an extended interface controller 217 to the CPUs and other requestors in the system, such as service processors, I/O processors, and the like.

The move out queue server 210 is coupled to the move out queue tags 218 and the move out queue controller 219. The output of the move out queue controller 219 is supplied on line 201 to the select logic 200.

The key server 211 maintains local key array 220 and is coupled to a key array in a remote mainstore facility. The local key array 220 is used to provide storage keys to the CPUs and other requestors in the system separately from move ins of lines of data and from the translation logic in the S UNIT, as described above.

The mainstore server 212 supplies addresses to the local mainstore unit 221, and to a remote mainstore facility if present in the system.

The data paths for the system controller are shown in the bottom half of the figure. The output of the local mainstore unit is supplied on line 222 to ECC logic 223. The output of the ECC logic 223 is supplied to a switch 224. Other inputs to the switch 224 include the output of ECC logic 225 which is supplied from the remote mainstore unit, the output of the selector 226 which is used to supply data integrity move out data from the CPUs, and output of the selector 227 which is used to supply swap move out data from the CPUs in the system and store data from the various units in the system. Finally, the switch 224 receives bypass data across line 228. The output of the switch 224 is supplied to the fetch and store buffers 229-0 through 229-7. The data in the fetch and store buffers is supplied to switch 230. The switch 224 also supplies bypass path 231.

The output of the switch 230 supplies move out queue buffers 232, the move in data paths to the respective CPUs, and the fetch data paths to the variety of fetch data requestors. The output of the move out queue is supplied via ECC logic 233 on line 234 through error checking correcting logic 235 to the remote mainstore unit, and through ECC logic 236 to the local mainstore unit. Also, the data on line 234 is supplied as an input to the switch 224.

CONCLUSION

Accordingly, the present invention provides a system in which storage keys are maintained in the TLB on page boundaries. It allows page boundary based management of the key array in the cache to take advantage of TLB based storage keys. Concurrent key and move in requests minimize the key miss penalty, and allow maintenance of the key to be logically separate from move in algorithms. A net performance gain is achieved because of the ability to do store ahead on accesses which are subject of key protection checking is at least an order of magnitude greater than performance lost from key misses under this scheme.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A key validation and data retrieval system in a data processing system for providing data in response to a request where said request contains a request key and a logical address, said key validation and data retrieval system comprising:

first storage for storing a plurality of storage keys;

second storage for storing data;

a data buffer for storing data retrieved from said second storage at addressed locations in said data buffer where said locations are addressed by a first portion of a logical address;

a translation look aside buffer having a plurality of locations for identifying data stored in said data buffer where each said location is addressed by a second portion of a logical address and contains a storage key, a storage key valid indicator, a value corresponding to said second potion of said logical address and a physical data address;

data confirmation means for generating a first signal if the data stored in said data buffer at a location addressed by a first portion of said logical address of said request is not the data to be retrieved in response to said request;

key validation means for generating a second signal when said key valid indicator indicates an invalid storage key at a location addressed by a second portion of said logical address of said request;

control means comprising:

data retrieval means in response to said first signal for transferring the requested data from said second storage to said location addressed by said first portion of said logical address of said request;

key retrieval means in response to said second signal for recovering a storage key from said first storage which is associated with said physical address stored at said location in said look aside buffer addressed by said second portion of said logical address of the request and for setting said key valid indicator at said location in said look aside buffer addressed by said second portion of said logical address of the request to valid;

Wherein said data retrieval means retrieval of data from said second storage operates separately from said key retrieval means retrieval of a storage key from said first storage for reducing the total amount of time necessary to retrieve said data and said storage key while still permitting data to be retrieved into said data buffer without requiring a storage key to be retrieved from said first storage.

2. A key validation and data retrieval system in a data processing system for providing data in response to a request where said request contains a request key and a logical address, said key validation and data retrieval system comprising:

first storage for storing a plurality of storage keys;

second storage for storing data;

a data buffer for storing data retrieved from said second storage at addressed locations in said data buffer where said locations are addressed by a first portion of a logical address;

a translation look aside buffer having a plurality of locations for identifying data stored in said data buffer where each said location is addressed by a second portion of a logical address and contains a storage key, a storage key valid indicator, a value corresponding to said second potion of said logical address and a physical data address;

second portion logical address confirmation means for generating a first signal when a value corresponding to a second portion of said logical address of said request stored in a location in said look aside buffer addressed by said second portion of said logical address of said request is different then said second portion of said logical address of said request;

data confirmation means, in response to said second portion logical address confirmation means not generating said first signal, for generating a second signal if the data stored in said data buffer at a location addressed by a first portion of said logical address of said request is not the data to be retrieved in response to said request;

key validation means, in response to said second portion logical address confirmation means not generating said first signal, for generating a third signal when the key valid indicator indicates an invalid storage key at said location addressed by said second portion of said logical address of said request;

a translator for generating a physical address from said second portion of said logical address of request;

control means comprising:

data retrieval means in response to said second signal for transferring said requested data from said second storage to said location being addressed by said first portion of said logical address of said request;

address storing means in response to said first signal for storing in said look aside buffer said second portion of said logical address of said request and said physical address generated by said translator from said second portion of said logical address of said request at said location addressed by said second portion of said logical address of said request;

key retrieval means in response to said third signal for recovering a storage key from said first storage which is associated with said physical address stored at said location in said look aside buffer addressed by said second portion of said logical address of said request and for setting said key valid indicator to valid at said location in said look aside buffer addressed by said second portion of said logical address of said request after said address storing means has stored said physical address in response to said first signal;

wherein said data retrieval means retrieval of data from said second storage operates separately from said key retrieval means retrieval of a storage key from said first storage for reducing the total amount of time necessary to retrieve said data and said storage key while permitting data to be retrieved into said data buffer without requiring a storage key to be retrieved from said first storage.

* * * * *

UNITED STATES PATENT AND TRADEMARK OFFICE
CERTIFICATE OF CORRECTION

PATENT NO.   : 5,603,008
DATED        : February 11, 1997
INVENTOR(S)  : Ronald N. Hilton et al.

It is certified that error appears in the above-indentified patent and that said Letters Patent is hereby corrected as shown below:

Column 11, line 13, "potion" should be --portion--;

Column 11, line 37, "Wherein" should be --wherein--;

Column 12, line 2,  "potion" should be --portion--;

Column 12, line 9,  "then" should be --than--.

Signed and Sealed this

Twenty-sixth Day of May, 1998

Attest:

BRUCE LEHMAN

Attesting Officer

Commissioner of Patents and Trademarks